US010061534B2

(12) United States Patent
Gupta et al.

(10) Patent No.: US 10,061,534 B2
(45) Date of Patent: Aug. 28, 2018

(54) HARDWARE BASED MEMORY MIGRATION AND RESILVERING

(75) Inventors: Saurabh Gupta, Tacoma, WA (US); Satish Muthiyalu, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 13/994,150

(22) PCT Filed: Dec. 1, 2011

(86) PCT No.: PCT/US2011/062788
§ 371 (c)(1),
(2), (4) Date: Jun. 14, 2013

(87) PCT Pub. No.: WO2013/081616
PCT Pub. Date: Jun. 6, 2013

(65) Prior Publication Data
US 2013/0268739 A1    Oct. 10, 2013

(51) Int. Cl.
*G06F 3/06* (2006.01)
*G06F 11/16* (2006.01)
(Continued)

(52) U.S. Cl.
CPC .......... *G06F 3/065* (2013.01); *G06F 11/1666* (2013.01); *G06F 11/2017* (2013.01); *G06F 11/076* (2013.01); *G06F 11/0724* (2013.01)

(58) Field of Classification Search
CPC ...................................................... G06F 12/16
See application file for complete search history.

(56) References Cited

U.S. PATENT DOCUMENTS 5,978,912 A * 11/1999 Rakavy ................. G06F 9/4416
709/222
2004/0073743 A1 * 4/2004 Arimilli .............. G06F 12/0646
711/5
(Continued)

FOREIGN PATENT DOCUMENTS

CN    1489059 A    4/2004
CN    1520564 A    8/2004
(Continued)

OTHER PUBLICATIONS

International Preliminary Report on Patentability and Written Opinion received for PCT Patent Application No. PCT/US2011/062788, dated Jun. 12, 2014, 5 pages.
(Continued)

*Primary Examiner* — Eric Cardwell
(74) *Attorney, Agent, or Firm* — Law Office of R. Alan Burnett, P.S

(57) ABSTRACT

Method, apparatus and systems for performing hardware-based memory migration and copy operations. Under the method, a first portion of memory in a computer system accessed via a first memory controller is migrated or copied to a second portion of memory accessed via a second memory controller using a hardware-based scheme that is implemented independent of and transparent to software running on a computer system. The memory migration and/or copy operations can be used to initialize a memory mirror configuration under which data in first and second portions of memory are mirrored, and to perform memory migration operations in which data in a first portion of memory is migrated to a second portion of memory under the control of hardware in a manner in which the memory migration can be performed during run-time without a significant reduction in performance. In addition, poison
(Continued)

data indicating failed cache lines may be migrated or copied such that data corresponding to migrated or copied poisoned cache lines are not used.

23 Claims, 10 Drawing Sheets

(51) Int. Cl.
    *G06F 11/20*     (2006.01)
    *G06F 11/07*     (2006.01)

(56) References Cited

U.S. PATENT DOCUMENTS

| | | |
|---|---|---|
| 2009/0254705 A1 | 10/2009 | Abali et al. |
| 2010/0070718 A1 | 3/2010 | Pong |
| 2010/0174934 A1 | 7/2010 | Zhao et al. |
| 2011/0154104 A1* | 6/2011 | Swanson et al. ............ 714/6.23 |
| 2012/0030424 A1* | 2/2012 | Nunez .................... G06F 3/0617 711/114 |

FOREIGN PATENT DOCUMENTS

| | | |
|---|---|---|
| CN | 102110036 A | 6/2011 |
| WO | 2013/081616 A1 | 6/2013 |

OTHER PUBLICATIONS

International Search Report and Written Opinion received for PCT Application No. PCT/US2011/062788, dated Jul. 30, 2012, 8 pages.

Office Action received for Chinese Patent Application No. 201180075280.7, dated Dec. 29, 2015, 9 pages Chinese Office Action only.

Office Action received for Chinese Patent Application No. 201180075280.7, dated Sep. 2, 2016, 23 pages of office action including 15 pages of English Translation.

Office Action and Search Report received for Chinese Patent Application No. 201180075280.7, dated Feb. 21, 2017, 31 pages of Chinese Office Action including 21 pages of English Translation.

* cited by examiner

HARDWARE BASED MEMORY MIGRATION AND RESILVERING

FIELD OF THE INVENTION

The field of invention relates generally to computer systems and, more specifically but not exclusively relates to memory migration and mirroring in high reliability computer systems, such as RAS servers.

BACKGROUND INFORMATION

Memory integrity and reliability and are core aspects of computer server reliability, particularly for RAS (reliability, availability, and serviceability) servers. To insure that memory integrity is maintained, computer systems have various mechanism for error checking relating and otherwise monitoring the health of memory resources, such as using ECC (Error Correction Codes) at the hardware level. Other measures are typically implemented at the firmware level, such that an operating system only needs to responds to errors that are detected at the hardware and/or firmware levels, and does not have to proactively detect such errors. Another technique for ensuring memory reliability and availability is to provide mirrored ranks of memory, such that there a backup copy of each memory resource during normal operations so that if one or a portion of a memory resource fails, execution can continue without disruption by accessing memory resources that have not failed or become corrupted.

At some point in time, there is bound to be a failure. In response to detection of such a failure, a fail-over procedure is implemented so that memory accesses are redirected to the memory resource holding the "good" copy of data and a new backup copy is written to another memory resource not currently in use. This process becomes significantly more complicated under modern architectures employing multi-core processors with multiple cache levels and multiple memory controllers, such as found in today's high-reliability server architectures.

Current server memory controllers support only software-based mirror/memory migration. When a mirror fail-over occurs, an SMI (System Management Interrupt) is generated. A BIOS SMI handler puts the master node in memory migration mode and generates reads and writes targeting all the addresses mapped by the failing master node. There are many practical issues with this approach. Time spent within the SMI handler has to be limited to keep the OS responsive (for example, an SMI handler must be executed to completion within 150 μsec). Hence, only a small chunk of memory copy can be handled during each SMI cycle, and the whole memory migration process has to be spread over multiple recurring SMI cycles. This is highly inefficient and has serious drawbacks when handling error conditions such as 'poison' mode (i.e., a cache line with an error that has yet to be consumed) and other error conditions. In the current generation of Server CPUs, there is no indication of poison mode until the 'poisoned' data reaches the consumer. Therefore, with software-based migration, any poisoned data could potentially be consumed by the SMI handler during the migration process and could eventually lead to failure of the overall system. Current generation CPUs workaround this problem by using convoluted and complex approaches that are highly inefficient and keeps the Master/Slave nodes in migration mode longer than is actually required.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a schematic diagram illustrating further details of aspects of the system architectures of FIG. 1a;

DETAILED DESCRIPTION

Figure 1A:
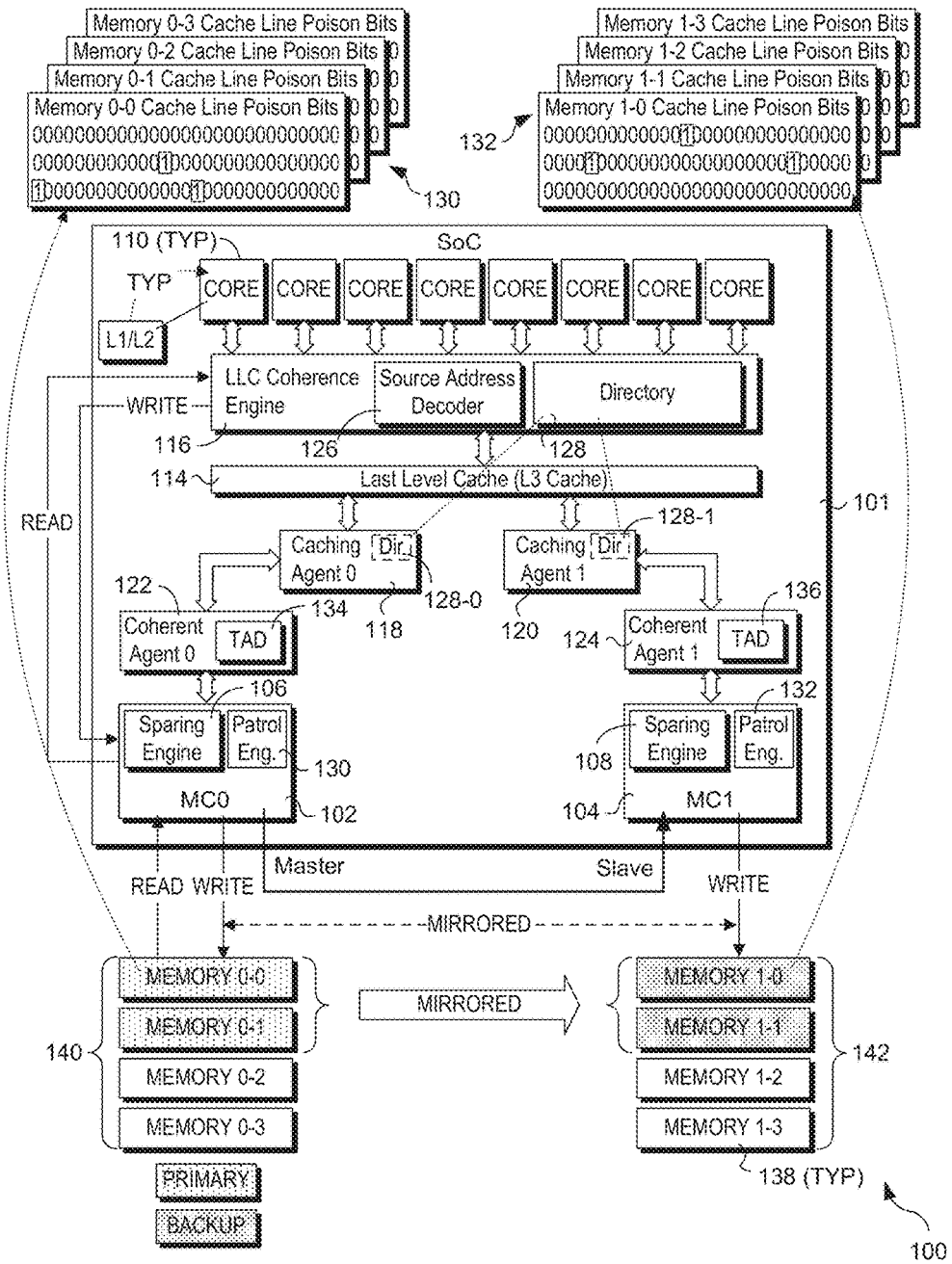
FIG. 1a is a schematic diagram illustrating a system architecture in mirrored memory state.

Embodiments of methods and apparatus for hardware-based memory migration, memory mirroring, and memory fail-over are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Typical RAS server architectures employ one or more processors, each having one or more memory controllers that are mapped to respective portions of physical memory. For example, a given memory controller may be mapped to one or more addressable units of memory, that in turn is physically stored on memory chips having memory configured to support RAS characteristics, such as ECC memory that has one or more extra information and/or ECC bits for each cache line or memory segment (compared with memory typically employed in conventional personal computers and the like). It is common to refer to the smallest addressable portion of memory as a cache line or memory line, and these terms are used interchangeably herein. Generally, address ranges corresponding to multiple cache lines are mapped in one or more groups to one or more ranks of memory, wherein each rank is associated with all or a portion of memory stored on a corresponding memory module, such as a dual in-line memory module (DIMM). Each DIMM includes multiple memory chips that may be configured in various manners depending on the particular vendor implementation and overall capacity of the module. The same DIMM "slot," which comprises a memory module interface that is physically connected to a memory controller through an applicable memory interface (e.g., a bus, interconnect, DDR3 interface, etc.) may be used for DIMMs of various sizes, such as 1 GB, 2 GB, or 4 GB. In turn, a system may have multiple DIMM slots for installing respective DIMMs, such that the overall capacity of memory for a given system is a function of the size and number of DIMMs. Moreover, this same memory architecture may be repeated for each of multiple memory controllers in a given server.

Memory controllers are used to provide various functions relating to memory access and storage. These generally include such things as error checking and memory refresh, as well as Reading and Writing to cache lines in order to access and store data. Memory controllers and/or associated agents and cache-related components also provide additional functionality relating to memory mapping, such that they present a logical view of the memory mapping to an operating system that is abstracted from the actual physical mapping at which data is actually stored. In addition the combination of memory controllers and other system components below the OS level (e.g., embedded logic and/or firmware) enables data to be moved between different physical memory addresses in a manner that is transparent to the operating system. Moreover, various components and logic, such as memory coherency agents, are employed to ensure that memory integrity is maintained, again in a manner that is transparent to the operating system.

Another aspect of RAS-class servers is the ability to support memory mirroring and fail-over. Under memory mirroring, all or selected portions of memory are mirrored such that there is a backup instance (copy) of each portion of mirrored memory. In the context of the present application, a primary copy of data is managed by a "master" node, and a backup copy of the data is managed by a "slave" node. Generally, the master and slave nodes will correspond to respective master and slave memory controllers, although it is possible for a single memory controller to support memory mirroring.

Under a master and slave memory mirroring architecture, all Reads from memory are implemented via the master memory controller, while each Write is mirrored across both the master and slave memory controllers, wherein the master controls (i.e., commands) write operations performed by the slave. In this manner, a mirrored copy of all of the data (for a selected portion of data that is to be mirrored) is maintained.

Memory integrity under the foregoing architectures and techniques work well as long as there are no failures. However, since failures are bound to occur on most systems at some point in time, measures must be taken to handle an error event such that minimum or (preferably) no loss in data integrity results. The most typical failures are in the memory chips themselves. Memory chips have some of the highest transistor densities of any solid-state circuitry; this generally leads to failures corresponding to relatively small portions of the memory, such as individual bits, cache lines, etc. These types of errors may be detected through error correction codes or other means, typically implemented via a memory controller and/or a controller or other circuitry on a DIMM. Since the smallest addressable portion of memory is an address to a cache line, when a bit error in a cache line occurs, the entire cache line is "marked" as bad or "poisoned," and the corresponding logic is implemented so as to no longer use that cache line.

Typically, system logic will be implemented to monitor the memory error levels in a system. Under one approach, an error threshold will be set such that once the number of memory errors exceeds the threshold, a memory failure situation will be detected. In response to the memory failure, a fail-over process will be initiated under which memory access control will be transferred between the master and slave nodes so that the backup copy of the data becomes the new primary copy, and the former slave node becomes the new master node. In effect, the memory data corresponding to the memory that is failed is not transferred, but rather the fail-over process involves the updating of memory configuration information and address decoding information.

FIG. 1a shows a system architecture 100 depicted in a first exemplary mirrored memory state. System architecture 100 includes a System on a Chip (SoC) 101 including a pair of memory controllers 102 and 104 (respectively labeled MC0 and MC1). Each of memory controllers 102 and 104 includes a respective Sparing Engine 106 and 108 and Patrol Scrub Engines 107 and 109.

Each of memory controllers 102 and 104 is operatively coupled to one or more processor cores 110 on SoC 100 via use of various components and agents. For purposes of illustration, 8 processor cores are shown in FIG. 1a—however, it will be understood that various numbers of processor cores may be implemented on SoC's on which the principles and teachings of the memory migration and copy techniques disclosed herein may be deployed. Generally, a multi-layer caching system with coherency will be implemented on a multi-core SoC to facilitate high-speed memory access operations while maintaining coherency across the various cache layers. The cache layers typically include first and second layer caches, commonly referred to as L1/L2 caches, which are "private" to each processor core 110. This is depicted as an L1/L2 cache 112, and although only a single block is shown it will be understood that each processor core 110 includes a similar L1/L2 cache. Other cache/coherency components and agents include a Last Level Cache (LLC) 114, which in this instance is a level 3 or L3 cache, but in general corresponds to the last level of cache employed by a system. While L1/L2 caches 112 are private to respective processor cores 110, in some embodiments LLC cache 114 comprises a shared cache that is accessible to all of the processor cores. In one embodiment, LLC cache 114 is divided into multiple LLC "slices," with the memory range portion corresponding to each slice nominally allocated to a corresponding processor core.

Cache coherency is maintained by a combination of interacting components, including an LLC coherence engine 116, caching agents 118 and 120 (respectively depicted as caching agents 0 and 1), and coherent agents 122 and 124, which are also referred to as home agents. LLC coherency engine 116 includes a Source Address Decoder (SAD) 126, and a directory 128. Each of coherent agents 122 and 124 include a respective Target Address Decoder 134 and 136. Optionally, directory 128 may be managed by caching agents 118 and 120, as depicted by directories 128-0 and 128-1.

Each of memory controllers 102 and 104 are also operatively coupled to one or more memory ranks 138, respectively depicted as memory rank groups 140 and 142. Various interface and interconnect circuitry is implemented to facilitate communication between the memory controllers and their respective memory resources, as discussed below; however, such circuitry is not shown in selected Figures herein for clarity and simplicity.

Generally, each of memory ranks 138 will be mapped to a physical address range in accordance with a predefined memory division scheme. For example, in one embodiment, each memory rank has a size of 2 GB. Accordingly, in architecture 100, each of memory rank groups 140 and 142 employ 8 GB of memory. This, however, is merely an exemplary configuration, as the size of the memory ranks may be different than 2 GB (e.g., 1 GB, 4 GB, etc.), and the number of memory ranks in each group may vary from 1 to many (e.g., 8, 12, 16, etc.).

Memory resources managed by a given memory controller may be actively allocated for primary/backup storage, used as a spare, or be inactive (or otherwise allocated but not currently being used to store system data, but available if additional memory storage is needed). In the configuration illustrated in FIG. 1*a*, memory ranks 0-0 and 0-1 are allocated to primary storage, while memory rank 0-2 and 0-3 are unallocated. Meanwhile, memory ranks 1-0 and 1-1 are used for active storage (initially as backup storage), and memory ranks 1-2 and 1-3 are inactive. As further shown in FIG. 1*a*, memory ranks 0-0 and 0-1 are respectively mirrored to memory ranks 1-0 and 1-1.

Patrol Scrub Engines 107 and 109 perform memory scrubbing operations, which in includes detecting uncorrectable memory errors. When a patrol scrub operation detects an uncorrectable error for a given memory location, the corresponding cache line is marked as poisoned through use of a cache line poison status bit. In one embodiment, 64 information bits are maintained for each 64 byte cache line, including 47 bits of CRC data, coherency bits, and various other data including a cache line poison status bit. In one embodiment the memory information bits are stored in system memory in-line with corresponding cache line data, such that each set of cache line data and corresponding cache line information bits comprise 72 bytes.

Sets of poison data bitmaps 130 and 132 are depicted towards the top of FIG. 1*a*. Each poison data bitmap corresponds to a set of Memory Cache Line Poison Bits corresponding to a respective memory rank, wherein the error status of a given cache line is depicted by a 1 (error) or 0 (OK) for simplicity; in an actual implementation, the error status would be combined with other bits for each cache line, such as ECC bits, coherency bits, etc. (not shown) that are stored in the memory itself, rather than in a separate data structure, as discussed above. For simplicity, poison data bitmaps 130 and 132 are logical depictions of only cache line error status information used for illustrative purposes herein, and do not comprise separate sets of data in an actual implementation. In addition to marking the error status of each line, logic is provided for determining an error threshold, which could be a number errors for a given rank (e.g., n errors, where n is an integer from 1-m), an error density threshold (e.g., a number of errors corresponding to addresses in close proximity), or based on other measures.

When a cache line error is detected, the cache line is marked as "poisoned," and corresponding operations are implemented so that the cache line is not used going forward. For example, the most recent data update to the cache line may actually be in one of the cache levels, rather than system memory. In this case, the errant cache line may be remapped internally to an address corresponding to another cache line that does not already contain data, and when the updated cache line data is written back to system memory the remapped memory address is used. In addition or optionally, the mirrored data corresponding to the failed cache line in the slave node may be used as the "good" copy of data.

As depicted, each of poison data bitmaps 130 and 132 show a few bits with a value of '1', indicating those lines are poisoned. Moreover, the poison data bitmap data will be unique to each respective portion of memory (exemplified by the bitmap patterns for the memory ranks shown). It is further noted that the depiction of any cache lines marked as poisoned is for illustrative purposes in general, as is some embodiments a single error will correspond to a memory failure condition, and thus prior to this condition none of the cache lines would be marked as poisoned.

In response to an error threshold event (or otherwise identification of a memory failure), a fail-over process is initiated. As discussed above, during a fail-over in connection with a mirrored memory configuration, the node for controlling memory access is switched from the (failed) master to the slave, such that the slave node becomes the master node. Since each Write is mirrored, the data associated with the master and slave nodes will be identical (absent any poisoned cache lines). Accordingly, there is no need to copy memory data from the master to the slave node during the fail-over.

Figure 1B:
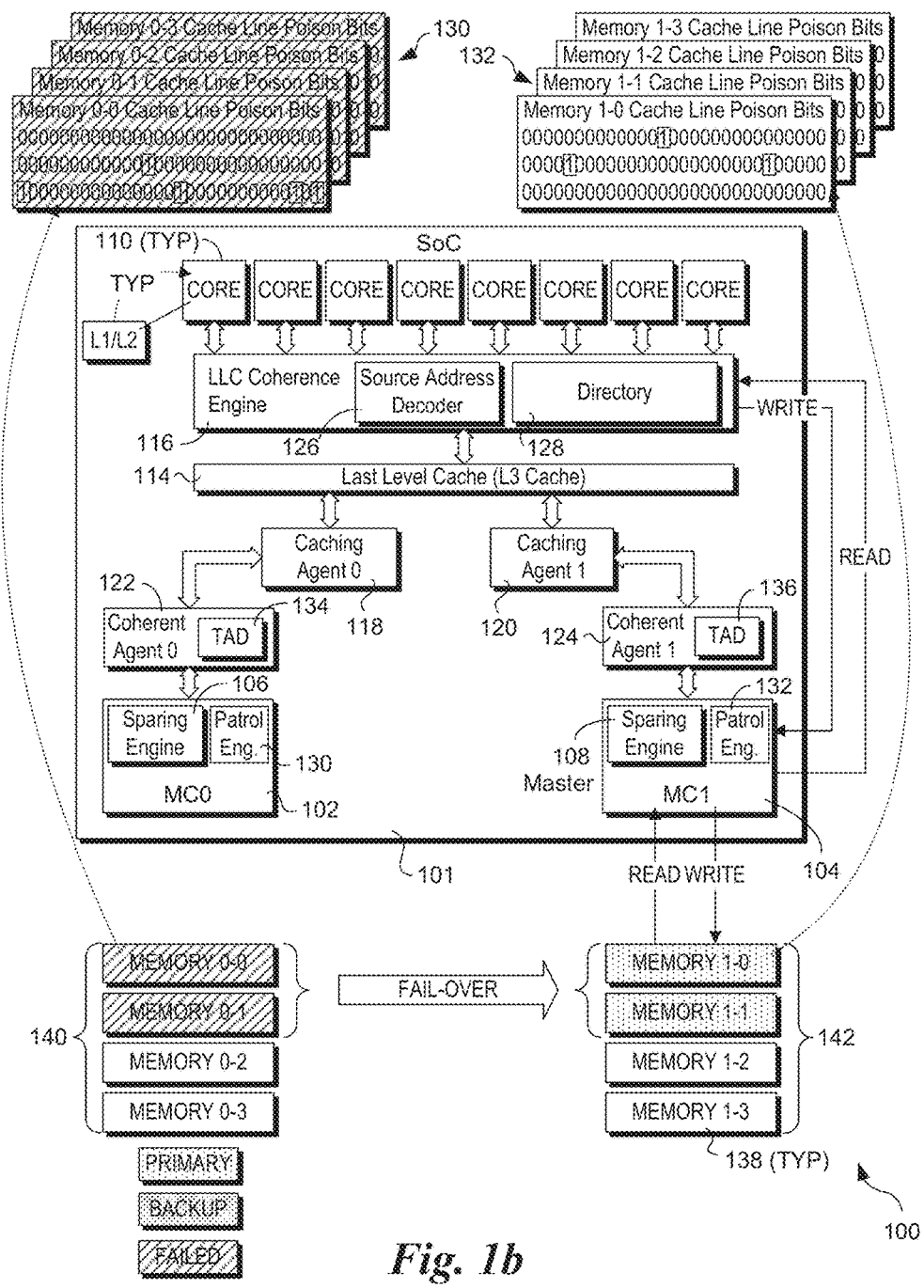
FIG. 1b shows the system architecture of FIG. 1a in a state after a memory fail-over has been performed, in accordance with one embodiment.

The configuration of system architecture 100 after a memory fail-over has been completed is shown in FIG. 1*b*. Notably, the former slave role of memory controller 104 has been switched to a master role (at this point with no slave node), with memory ranks 1-0 and 1-1 now being used as primary memory, while memory ranks 0-0 and 0-1 are now marked as failed. In addition, both Writes and Reads are respectively written to and read from the primary memory ranks 1-0 and 1-1.

The fail-over results in a "logical" memory migration since the actual data in memory ranks 1-0 and 1-1 (which mirrored memory ranks 0-0 and 0-1 before fail-over was initiated) remains the same as before, with the memory rank mapping data in source address decoder 126 being updated to reflect the changed configuration.

Figure 1C:
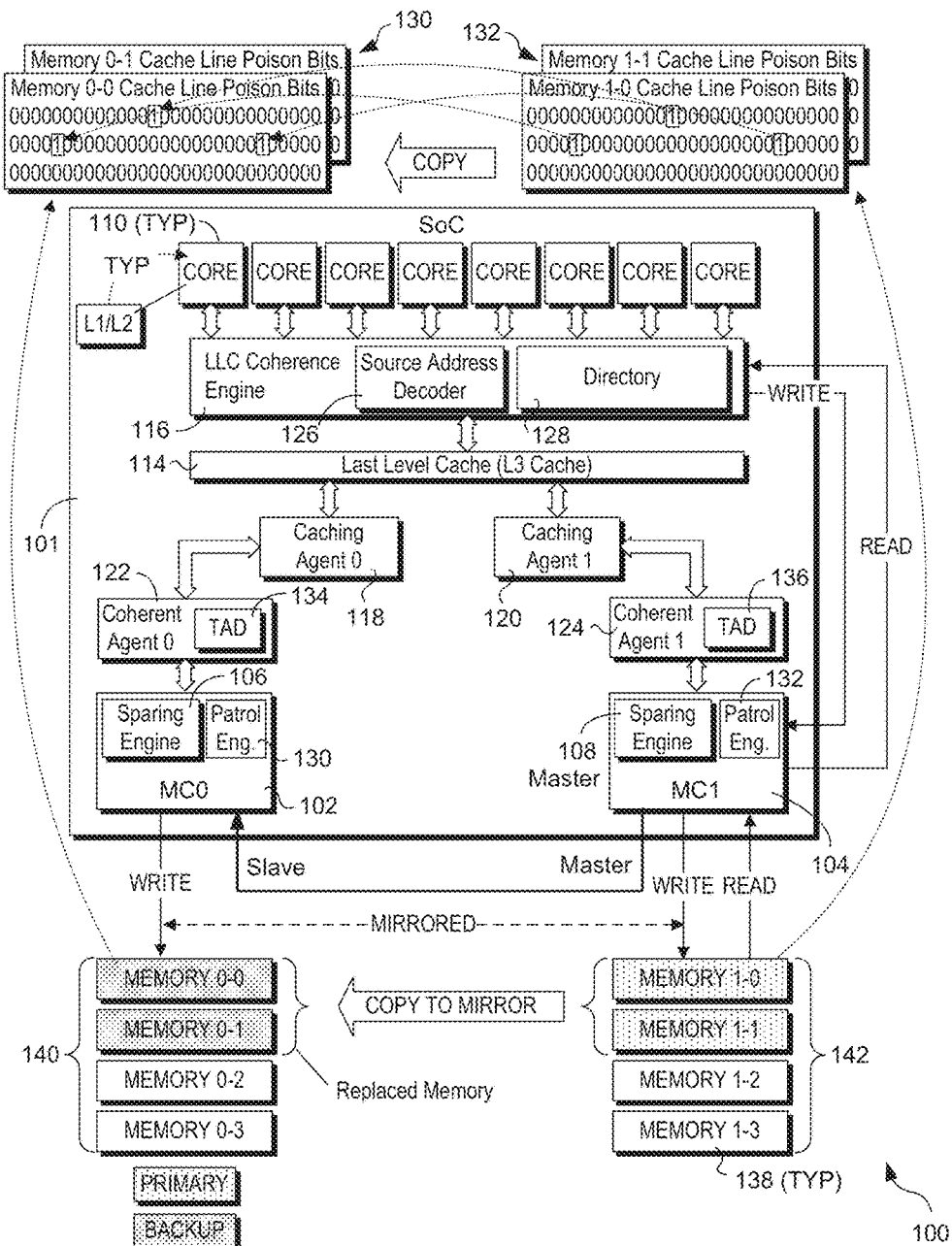
FIG. 1c shows a configuration of the system architecture of FIG. 1a corresponding to a restored mirror configuration resulting from memory resilvering.

At the time shown in FIG. 1*b*, the original primary memory has failed and has yet to be replaced. In one embodiment, upon replacement of failed memory ranks (e.g., replacement of memory ranks 0-0 and 0-1), a type of copy operation called a memory "resilvering" operation is performed to restore the system to a mirrored backup configuration. A similar memory copy operation may be performed to initially configure a mirror backup configuration that did not previously exist, such as at system boot. In these instances since a mirror backup doesn't currently exist, one needs to be created. Accordingly, after the failed memory has been replaced (or once target ranks to be mirrored are identified, such as at system boot), memory data is copied from source memory controlled by a first memory controller (e.g., memory controller 104 in FIG. 1*b*) to target memory (e.g., the replaced memory or identified memory) controlled by a second memory controller (e.g., memory controller 102). An example of this type of memory copy operation is depicted in FIG. 1*c*. Details of one embodiment of the memory copy operation under which memory data is copied in a manner that is transparent to system software are described below.

As discussed above, a poison data bitmap is maintained for each memory rank such that LLC coherence engine 116 and/or other memory/coherence agents are aware of which cache lines may be operating improperly and/or contain errant data (e.g., the poisoned cache lines). In addition, the data in any poisoned cache line should not be used after either a memory copy or memory migration process. Accordingly, as part of a memory copy operation performed during a memory resilvering or an initial mirror configuration operation in which memory is copied from one rank to another, the cache line error information (e.g., poison bits) is inherently copied at the same time. This is depicted in FIG. 1c as the poison data bitmap 132 data being copied into poison data bitmap 130, with the understanding again that the poison data bitmaps are merely representative of the poison status bits in the information bits for the various cache lines, and that in practice separate poison data bitmaps are not maintained in separate data structures or copied separately. Furthermore, applicable address mapping information is updated in source address decoder 126 and target address decoders 134 and 136, and the memory controllers are configured for corresponding master and slave node operations to support ongoing memory mirroring.

At the completion of the memory resilvering operation (or an initial memory mirror configuration operation, if applicable), the source memory controller (e.g., memory controller 104) retains its master node role and the target memory controller (e.g., memory controller 102) becomes a slave node, with memory ranks 1-0 and 1-1 accessed via the master node being used as primary memory, while memory ranks 0-0 and 0-1 accessed via the slave node are used as backup memory. In addition Reads are read from the primary memory ranks 1-0 and 1-1 via the master node. As before. Write operation are performed on memory controlled by both memory controllers, with the caveat that now memory controller 104 is the master that controls slave memory controller 102, and Writes to backup memory is effected via issuing memory Write commands from the master node memory controller to the slave node memory controller.

Figure 2A:
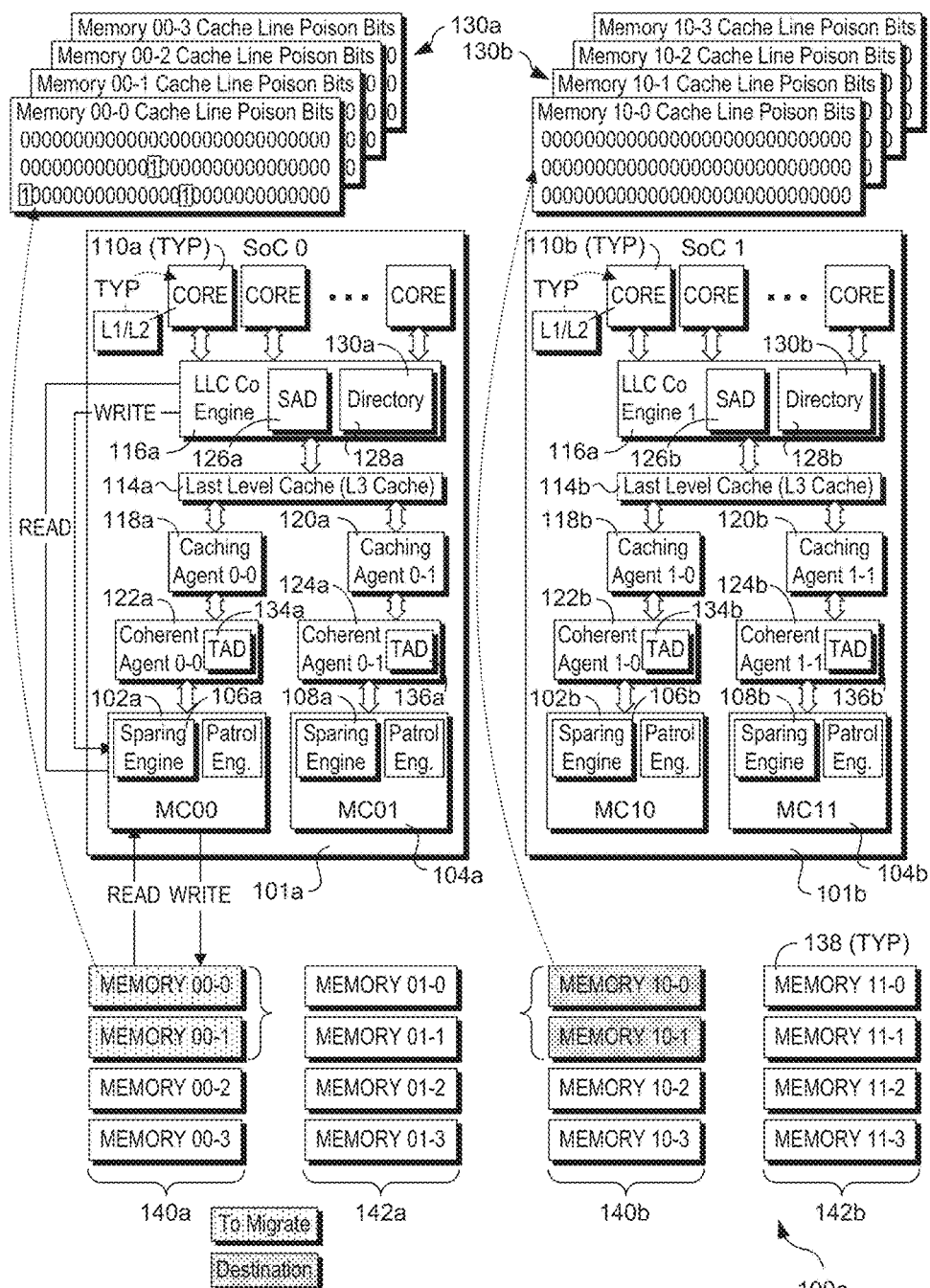
FIGS. 2a and 2b are schematic diagrams illustrating an exemplary memory migration in a system architecture including a pair of SoC's.
Figure 2B:
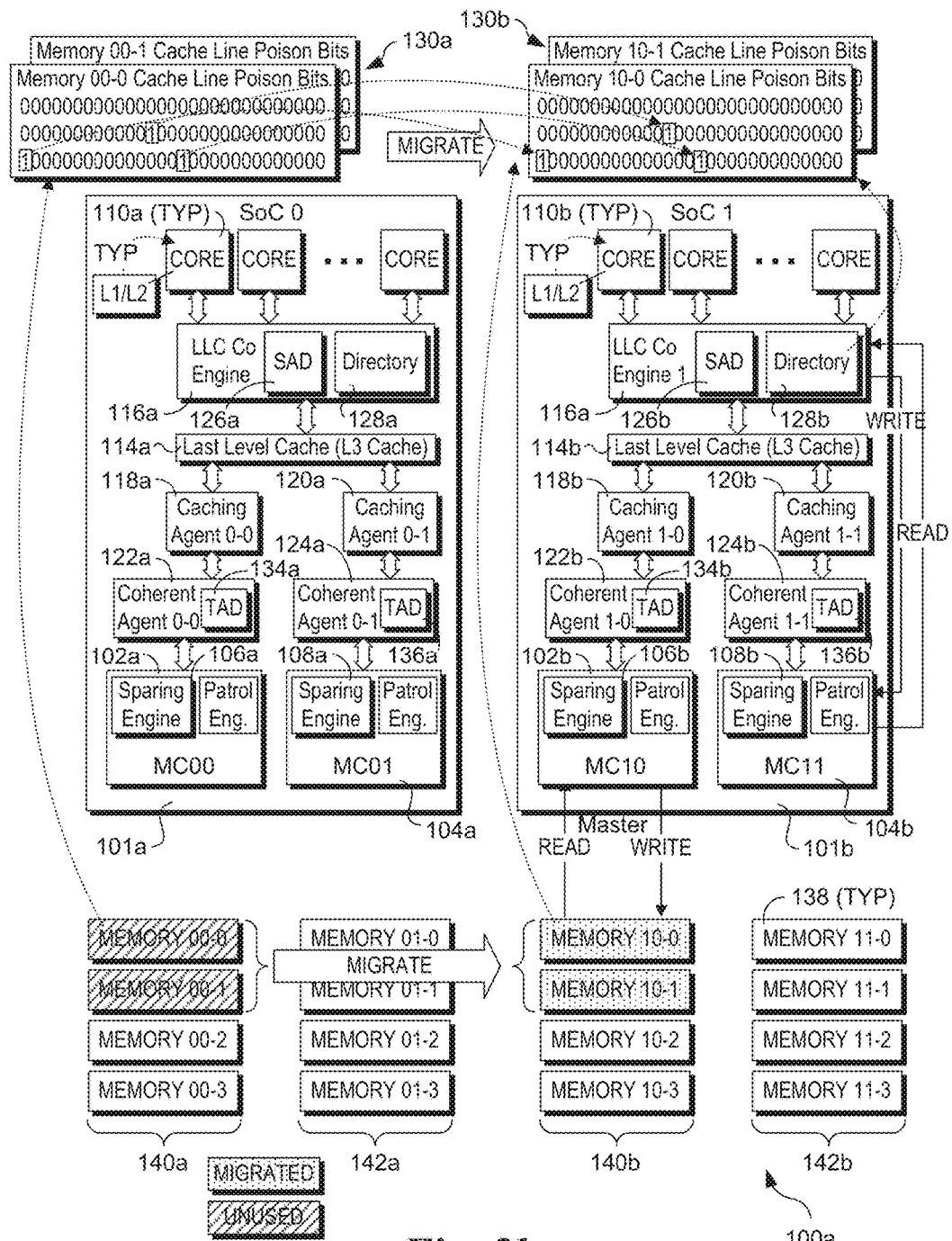

In addition to memory migration and/or mirroring between memory controllers in an SoC, memory migration and mirroring may be performed between memory controllers in different processors or different SoC's. For example, FIGS. 2a and 2b illustrate an exemplary memory migration in a system architecture 100a including a pair of SoC's 101a and 101b (respectively labeled SoC 0 and SoC 1). Elements in FIGS. 2a-c sharing common root reference numbers with elements in FIGS. 1a-c perform similar functions, with the corresponding elements associated with SoC 101 adding the suffix "a" and the associated elements associated with SoC 101b and the suffix "b." For example, processors cores 110a in Soc 101a and processor cores 110b in SoC 101b of architecture 101a operate in a similar manner to processor cores 110 of architecture 100. Also, as with the depiction of architecture 100, the number of processor cores in each of SoC 0 and SoC 1 can vary from 1 to many (e.g., 4, 8, 12, 16, etc.).

The memory ranks and poison data bitmaps in architecture 100a are labeled in the following manner. The first numeral identifies the SoC, the second numeral identifies the memory controller in the SoC, and the third numeral identifies the memory rank number. For example, Memory 00-0 in memory rank group 140a corresponds to a first memory rank controlled by memory controller 00 (102a) of SoC 0 (101a). Similarly, the cache line status data corresponding to poison data bitmap 130b associated with Memory rank 10-1 is labeled as Memory 10-1 Cache Line Poison Bits.

The process for performing a memory migration between memory controllers in different SoC's is substantially similar to performing memory migration or memory copy operation between a pair of memory controller in a single SoC (e.g., as illustrated in FIGS. 1a-c). For example, the configuration of architecture 100a before and after a memory migration has been completed are shown in FIGS. 2a and 2b. In the configuration shown in FIG. 2a, memory in memory ranks 00-0 and 00-1 accessed via a memory controller 102a (MC00) in Soc 0 is to be migrated to memory ranks 10-0 and 10-1, which are accessed via a memory controller 102b (MCIO) in Soc 1. Error maps 130a and 130b respectively show the poison bit state for their respective memory ranks prior to the migration. At the depicted state, memory ranks 10-0 and 10-1 contain no data, and also have no cache line errors, as depicted by all '0's in poison data bitmap 130b.

The memory migration is depicted in FIG. 2b. During a memory migration (i.e., without mirroring), memory data is copied from one or more source memory ranks to one or more destination memory ranks. After the memory data for has been copied, address remapping is performed and the portion of source memory being migrated is disabled or otherwise made unavailable, or optionally assigned a different activation status. For example, this is depicted toward the bottom of FIG. 2b, wherein the illustrated state corresponds to a condition after memory has been migrated from memory ranks 00-0 and 00-1 to memory ranks 10-0 and 10-1. As such, the source memory ranks are marked as unused in this example. Since memory data is being copied during a migration, the poison data likewise is inherently copied from source memory ranks to the destination memory ranks, as depicted toward the top of FIG. 2b. In a manner similar to before, the poison bits identifying the cache line errors in poison data bitmap 130a have been copied into poison data bitmap 130b, and the former non-used role of memory controller 102b has been switched to a master role (at this point with no slave node), while memory ranks 10-0 and 10-1 are now being used as primary memory, and memory ranks 00-0 and 00-1 are now marked as unused. In addition both Writes and Reads are now respectfully written to and read from the primary memory ranks 10-0 and 10-1. Also, memory address mapping information will be updated in SAD 126a and SAD 126b such that (from the operating system's point of view), memory accesses previously mapped to address ranges allocated to memory ranks 00-0 and 00-1 are remapped to corresponding address ranges allocated to memory ranks 10-0 and 10-1.

Figure 2C:
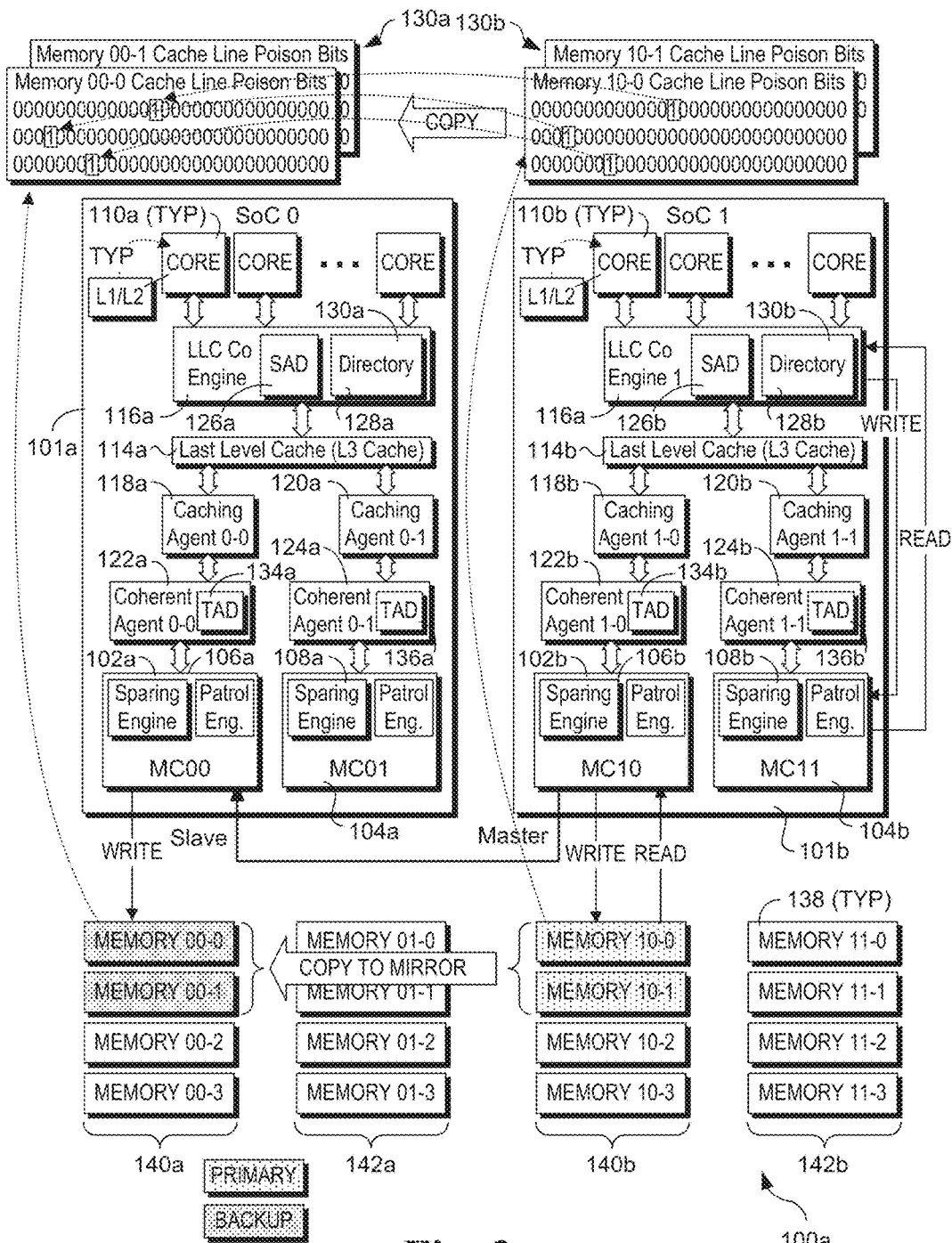
FIG. 2c depicts a mirrored memory initialization operation implemented using the system architecture of FIGS. 2a and 2b.

As with individual SoC's, memory ranks may be mirrored using controllers on separate SoC's. An example of this, according to one embodiment, is depicted in FIG. 2c. The operations are similar to the memory mirror configuration restore operation discussed above with reference to FIG. 1c, but in this example there isn't a previous mirror configuration, so the mirror configuration is being initialized rather than being restored. During the mirror configuration setup operations, memory data is copied from the source memory ranks 10-0 and 10-1 accessed via memory controller 102b to target memory ranks 00-0 and 00-1 accessed via memory controller 102a in a manner similar to a migration, except the source memory is still used as primary memory after the copy operation is completed. Similarly, the poison data bitmap data is copied (e.g., this is illustrated as poison data bitmap 130b being copied into poison data bitmap 130a). At the completion of the memory mirror configuration initialization operation, memory controller 102b retains its master role and memory controller 102a now becomes a slave node, with memory ranks 10-0 and 10-1 now being used as primary memory, while memory ranks 00-0 and 00-1 are now used as backup memory. In addition, Reads are read from the primary memory ranks 10-0 and 10-1. As before, Write operations are performed on memory controlled by both memory controllers 102a and 102b, with the caveat that now memory controller 102b is the master that controls slave memory controller 102a.

Figure 3:
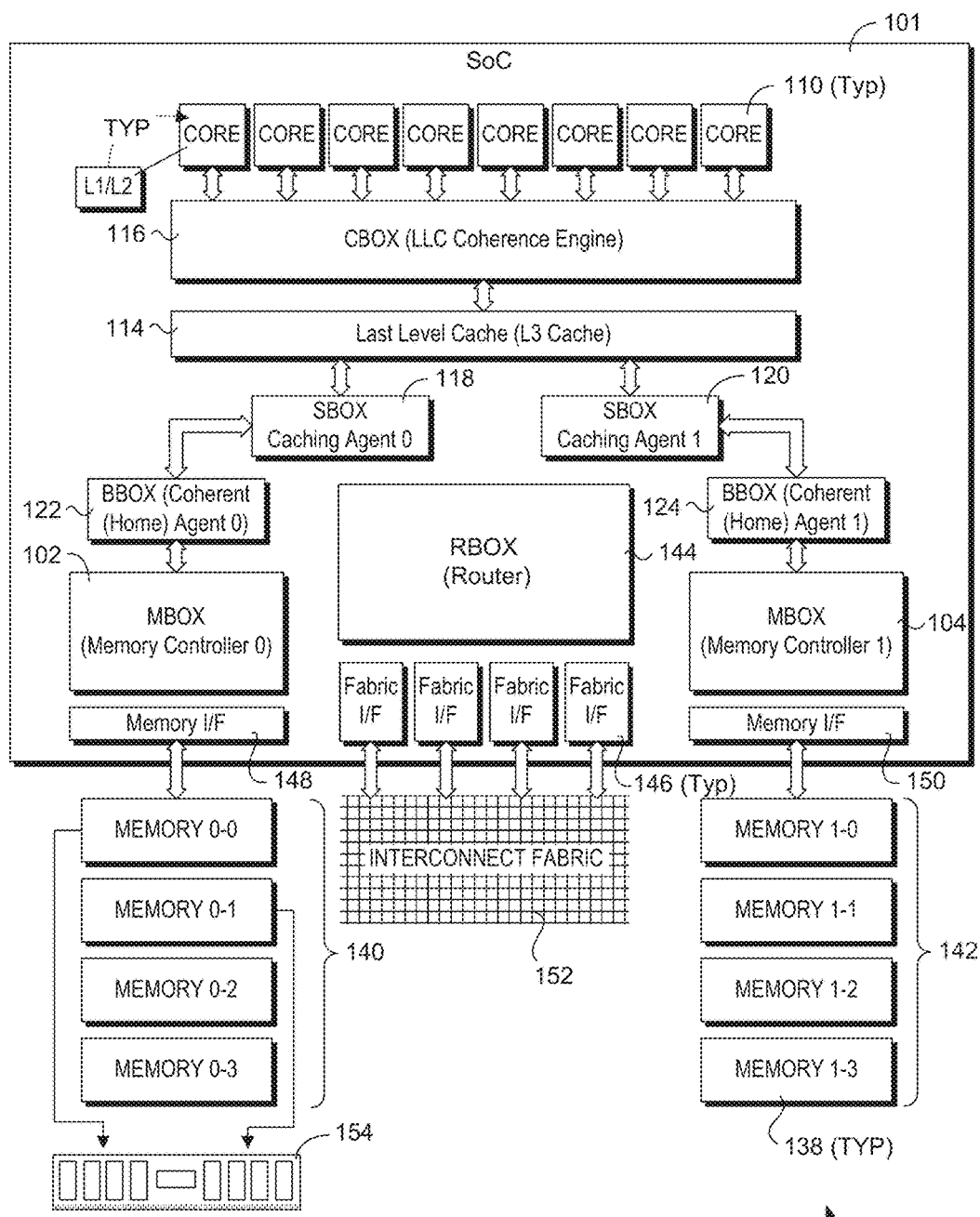

Further details of aspects of system architecture 100, according to one embodiment, are shown in FIG. 3, where components and elements sharing reference numbers with those shown in FIGS. 1a-c perform similar functions. In addition to previously discussed elements and components, selective components in architecture 100 are shown with their "BOX" names. In general, the "BOX" name reference corresponds to a box or area on an SoC used for implementing the corresponding functional block (i.e., embedded logic and circuitry to implement the components associated functionality) associated with the component. For example, LLC coherence engine 116 is referred to as the "CBOX", each of caching agents 118 and 120 is known as an "SBOX", etc.

System architecture 100 further includes various facilities for interfacing and interconnecting both components within SoC 101 and components that may be coupled to SoC 101. These are collectively depicted as a RBOX (router block) 144, fabric interfaces 146, and memory interfaces 148 and 150. Fabric interfaces 146 provide an interface between SoC 101 and one or more interconnect fabrics 152. In addition, the various double-headed arrows depicted in FIG. 3 illustrate various interfaces and interconnect both within SoC 101 and for interfacing/interconnecting to external components.

Each of memory controllers 102 and 104 employ a respective memory interface 148 and 150 for communication with memory ranks within their respective memory rank groups 140 and 142. As depicted by a DIMM 154, memory allocated for multiple memory ranks may be provided by a single DIMM; however, the particular mapping between logical memory rank addresses and physical memory addresses on one or more DIMMs is implemented through the combination of one or more of the memory controller, memory interface, and logic on the DIMMs themselves, as would be apparent to one skilled in the art. Accordingly, the use of a single DIMM for two memory ranks, as illustrated, is merely exemplary. Also, as discussed above, the memory interfaces will be communicatively coupled to one or more DIMM memory module interfaces (i.e., DIMM slots) via appropriate interface or interconnect circuitry, as applicable.

In an actual computer system implementation, such as for a RAS server, various components including one or more processors or SoC's and DIMM memory modules will be coupled to corresponding interface components and circuitry implemented on a "main" board and/or other boards or modules used in the system. For example, a typical RAS server may be configured as a blade server configured to be installed in a blade server chassis employing multiple blades, or may be configured as a rack server (e.g., a 1U, 2U or 4U rack server). Each of a blade server or rack server typically employ a primary printed circuit board (i.e., the main board) having various sockets and connector interfaces in which corresponding components are installed, such as processor or SoC sockets and memory module interfaces (e.g., DIMM slots). For example, a system implementation corresponding to system architecture 100a would include a main board having first and second sockets in which SoC 0 and SoC 1 (101a and 102b) would be respectively installed, along with a plurality of DIMM slots in which corresponding DIMMs would be installed, along with various interface circuitry embedded in the main board and/or other components or modules coupled to the main board. The use here of two SoC's is merely exemplary, as other numbers of SoC's could be implemented (e.g., 4, 6, 8, etc.). It is further noted that there may be system configurations where memory components (e.g., memory chips) are mounted directly to a main board or module permanently coupled to the main board and thus are not replaceable. Accordingly, as used herein a memory module interface may encompasses both a DIMM (or other memory module) slot and corresponding interface circuitry, as well a direct memory component interface.

Figure 4:
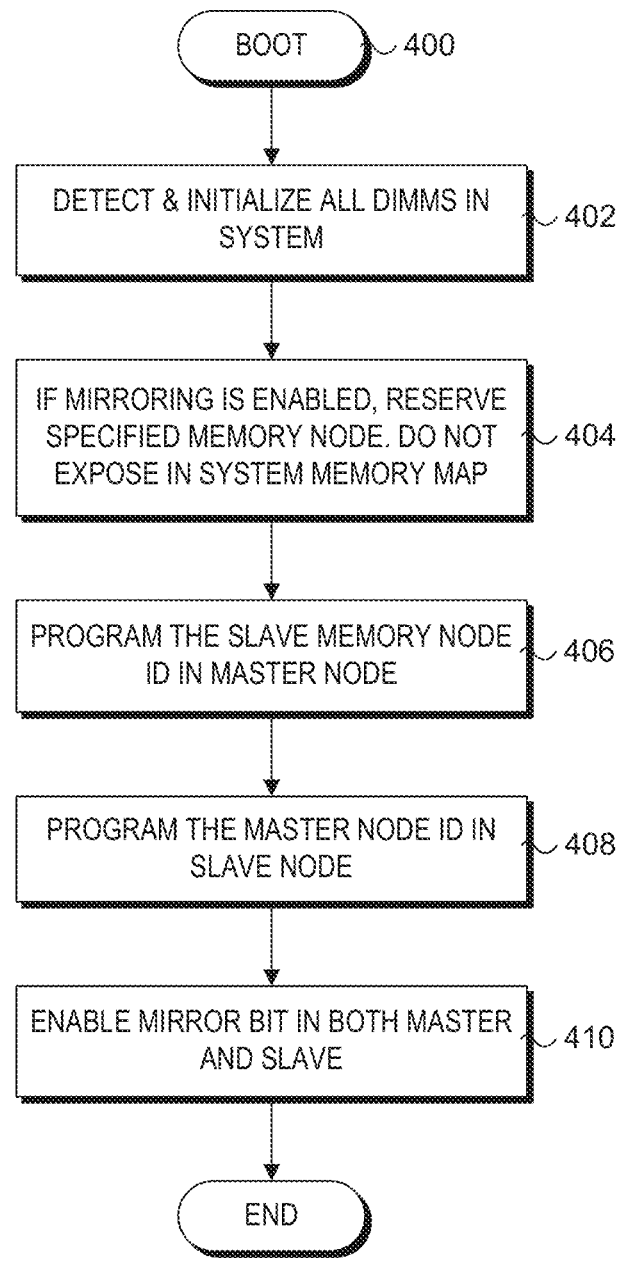
FIG. 4 is a flowchart illustrating operations performed during a memory mirror initialization setup operation.

A flowchart corresponding to initialization of a computer server or the like employing architecture 100, according to one embodiment, is shown in FIG. 4. In response to a cold or warm boot event 400, all DIMMs in the server (or on a given blade in a blade server architecture) are detected and initialized in a block 402. In a block 404, if mirroring is enabled, a corresponding memory node used for mirroring is specified to be employed as a slave node. This node is not exposed in the system memory map such that memory associated with the slave node is not accessible by any of the memory components other than the master node.

Next, the slave memory node ID is programmed in the master node in a block 406. Similarly, the master node ID is programmed in the slave node in a block 408. The initialization is completed in a block 410 with a mirror bit being enabled in both the master and slave nodes.

Figure 5:
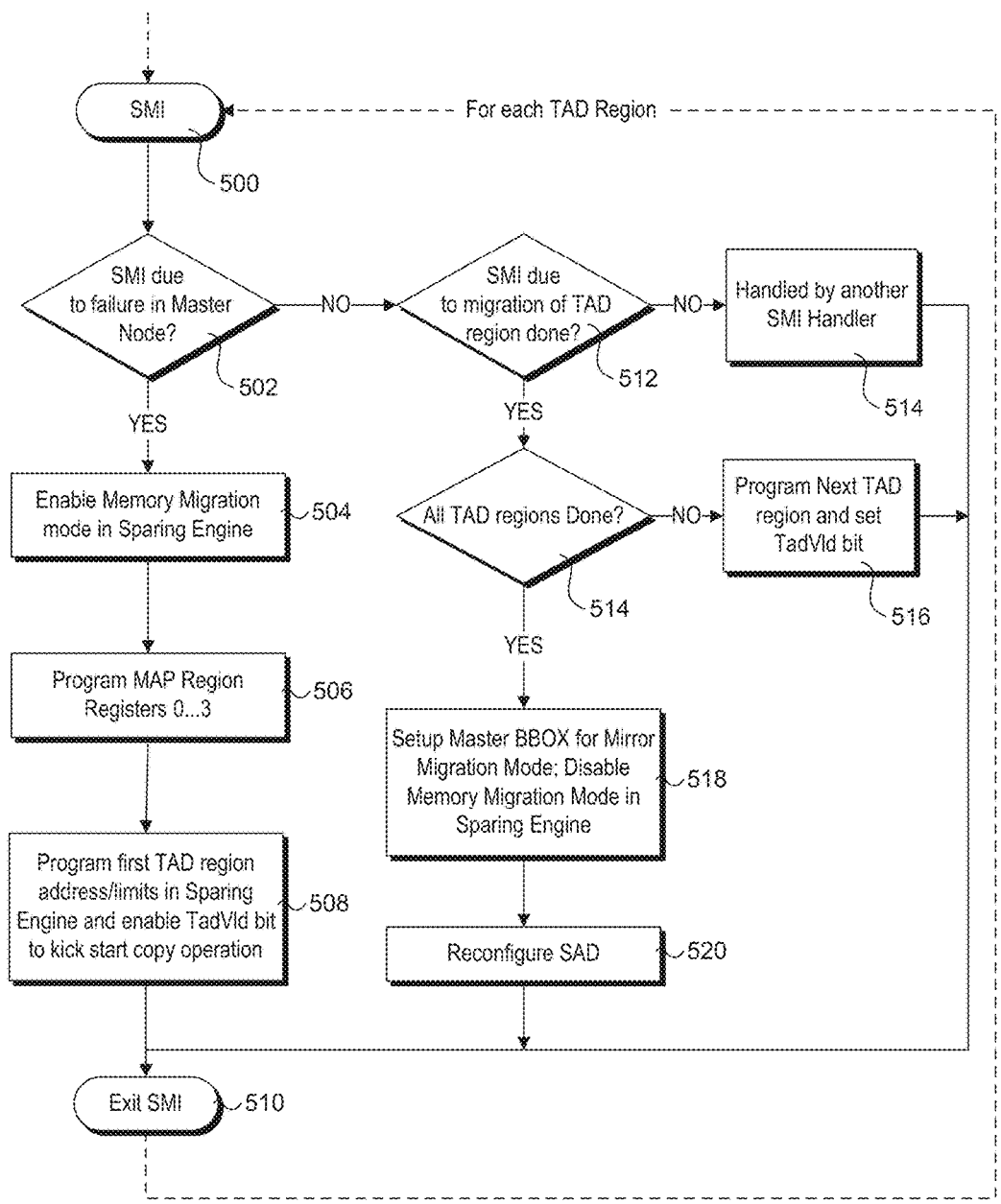
FIG. 5 is a flowchart illustrating operations performed during a hardware-based memory migration or memory copy operation, according to one embodiment.

FIG. 5 is a flowchart illustrating memory copy operations performed in connection with a memory migration or memory mirror initialization, according to one embodiment. During ongoing computer system operations, SMI's are generated by the BIOS or firmware in response to corresponding conditions, and appropriate SMI handling operations are performed by one or more SMI handlers (as generally depicted by a block 514 which represents handling of all SMI's other than SMI's due to a master node failure or corresponding migration/copy operation). Accordingly, the flowchart operations begin in response to invoking an SMI, as depicted at start block 500. If the SMI is due to a failure in a master node, as depicted by a decision block 502, the logic proceeds to a block 504 in with the memory migration mode is enabled in the sparing engine. In a block 506, the MAP region registers 0 . . . 3 are programmed. It is noted that there may be more MAP region registers for larger amounts of memory. Following this, a first TAD (Target Address Decoder) region address/limits is programmed in the sparing engine and the TadVld (TAD Valid) bit is enabled to initiate the memory copy operation for the first TAD region. This completes the handling of the SMI invoked in response to a master node failure, as depicted by Exit SMI end block 510.

At this point, a series of SMI's will be internally generated, one for each of multiple TAD regions to be processed. This is depicted by the dashed feedback loop labeled "For each TAD Region." This time, since the SMI is not due to a master node failure, the answer to decision block 502 is NO, and the logic proceeds to a decision block 512 in which a determination is made to whether the SMI is due to migration of a TAD region. In this case, the result is YES, and then the logic proceeds to a decision block 514 in which a determination is made to whether all TAD regions have been programmed. If not, the logic proceeds to a block 516 in which the next TAD region is programmed and the TadVld bit for the region is set. This completes handling of the current SMI, with the logic proceeding to exit SMI end block 510, and another SMI is generated. In accordance with decision block 514 and other logic and operations discussed above, this set of operations is repeated until all of the TAD regions have been programmed. When this has occurred, the answer to decision block 514 is YES, and the logic proceeds to a block 518 in which the Master BBOX (i.e., coherent or home agent corresponding to the Master node) is set up for mirror migration mode. The memory migration mode is then disabled in the sparing engine.

Figure 6:
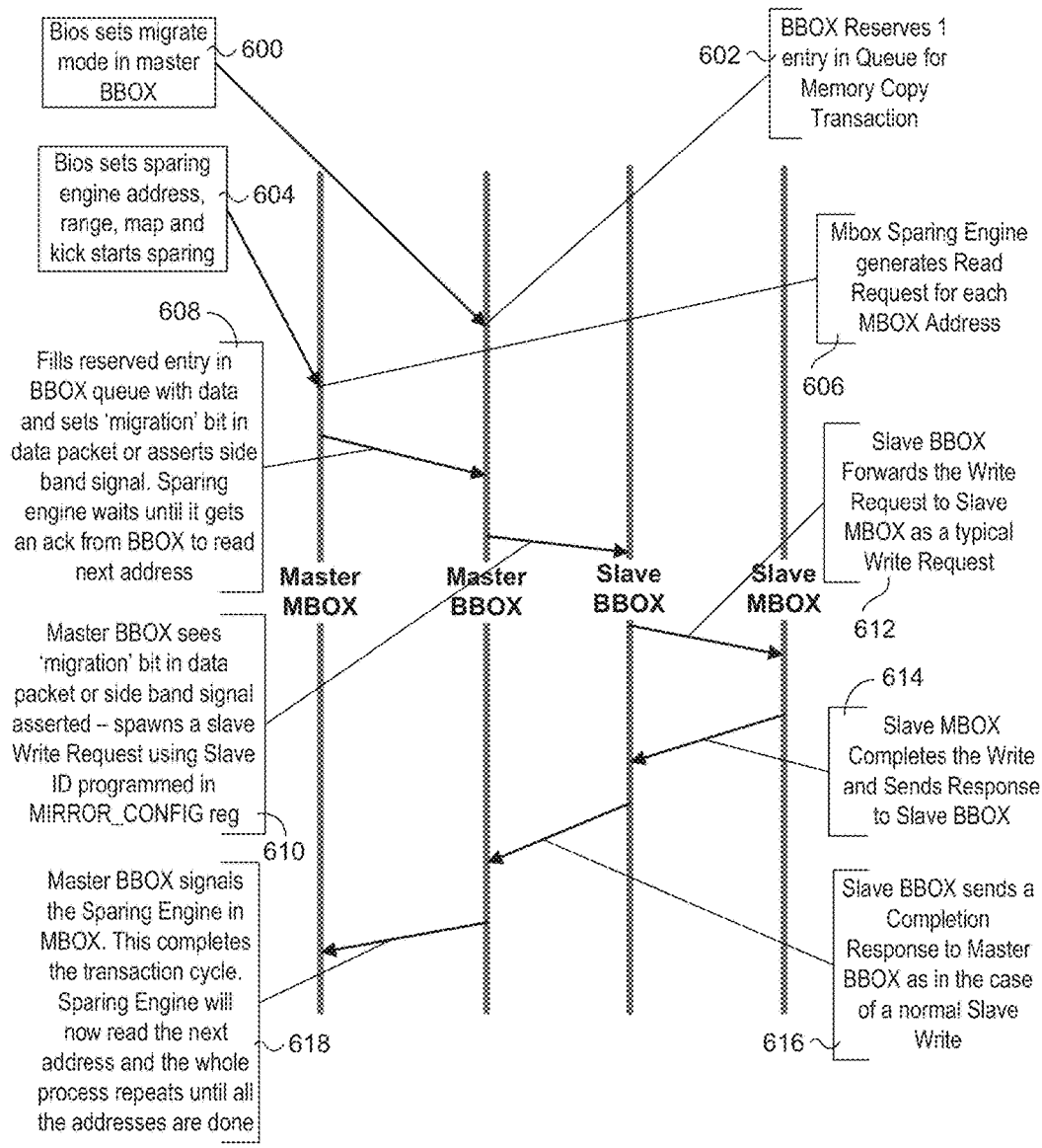
FIG. 6 is a time-line flow diagram illustrating operations performed by Master and Slave MBOXes and BBOXes during a memory migration or memory copy operation.

FIG. 6 shows further details of a memory migration/copy operation, in accordance with one embodiment. The vertical lines in FIG. 6 correspond to timelines for respective components comprising a Master MBOX (e.g. memory controller 102), a Master BBOX (e.g., coherent agent 122), a Slave BBOX (e.g., coherent agent 124), and a Slave MBOX (e.g., memory controller 104). During system initialization, the BIOS sets the migrate mode in the Master MBOX, as depicted in a block 600. In an associated operation 602, the Master BBOX reserves 1 entry in the queue for a memory copy transaction. Subsequently, the BIOS sets the sparing engine address, range, map, and initiates sparing, as depicted in a block 604.

The remaining depicted operations are repeated to perform a migration or copy. First, as shown by an operation 606, the Master MBOX sparing engine generates a read request for each MBOX address. As depicted by operations 608, the Master MBOX then fills a reserved entry in the Master BBOX queue with data and sets a migration bit in a data packet or asserts a sideband signal. The sparing engine then waits unit it gets an ACK from the Master BBOX to read a next address.

As shown by operations 610, the Master BBOX detects the 'migration' bit in the data packet or detects a side band signal is asserted, and in response spawns a slave Write Request using the Slave ID programmed in a MIRROR_CONFIG register. In an operation 612, the Slave BBOX forwards the Write Request to the Slave MBOX as a typical Write Request. The Slave MBOX then completes the Write and sends a response to the Slave BBOX, as depicted by an operation 614. The Slave BBOX sends a completion response to the Master BBOX, as in the case of a normal Slave Write, as shown by an operation 616. The Master BBOX then signals the sparing engine in the MBOX, in an operation 618. This completes the current transaction cycle, and the process is then repeated, beginning with operation 606 having the sparing engine reading the next address, for an applicable number of transaction cycles until all the addresses have been processed.

While aspects of operations in FIGS. 5 and 6 correspond to performing a data migration, it shall be understood that similar operations may be employed for performing one-way memory migration, as well as initializing or restoring a memory mirror configuration. In the context of FIG. 6, references to "master" and "slave" do not imply that a mirror configuration exists, but rather the master corresponds to the node at which the memory is being either copied from or migrated from, and the slave refers to the node to which memory is being migrated or copied, as applicable.

As discussed above, the various components and blocks illustrated in the SoC's of the Figures herein may typically comprise functional blocks that perform operations according to their "BOX" names. In further detail, operations performed by each BOX or functional block may be implemented via embedded logic and associated circuitry (e.g., circuitry for storing directory data, SAD data, TAD data, etc.) using semiconductor design and manufacturing techniques that are well-known in the art.

The techniques described herein provide significant advantages over existing solutions. Since the memory copying/migration operations are implemented in hardware, the overhead encountered by existing approaches is substantially reduced. Rather than produce a "storm" of SMI's (and corresponding SMI hander usage), the number of SMI's under the embodiments herein is greatly reduced. This results in high migration throughput, while also providing highly responsive system operations during migrations. In addition, the techniques support inherent and transparent poison data handling, and thus reduce system failures due to poisoned data consumption.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
performing memory access operations with a first and second memory controller integrated on a processor in a computer system including an operating system running on the computer system in system memory and system BIOS, the first and second memory controller being implemented to respectively access first and second portions of system memory, each of the first and second portions of system memory including respective sets of one or more address ranges; and
performing a hardware-based memory migration or copy operation during which memory data is migrated or copied from the first portion of system memory to the second portion of system memory in a manner that is transparent to the operating system and to the system BIOS.

2. The method of claim 1, wherein the hardware-based memory migration or copy operation is implemented with a sparing engine in the first memory controller.

3. The method of claim 1, further comprising:
detecting a cache line failure in a first cache line in the first portion of system memory;
marking the first cache line as poisoned;
during the hardware-based memory migration or copy operation, migrating or copying data corresponding to the first cache line to a corresponding second cache line in the second portion of system memory; and
migrating or copying information identifying the corresponding second cache line is poisoned.

4. The method of claim 1, further comprising:
performing memory Reads of cache lines in the first portion of system memory using the first memory controller and copying data corresponding to each memory Read to a corresponding cache line to the second portion of system memory using memory Write requests to the second memory controller originating from the first memory controller.

5. The method of claim 4, further comprising:
performing memory Reads and memory Writes for each cache line in the first and second portions of system memory such that first and second portions of system memory are mirrored to initialize a mirrored memory configuration; and maintaining a mirrored memory configuration by employing the first memory controller as a master node and the second memory controller as a slave node, wherein in response to a memory Read request, data is read from a corresponding cache line in the first portion of system memory via the first memory controller, and in response to a memory Write request, memory is written to corresponding cache lines in the first and second portions of system memory to effect a mirrored Write of data.

6. The method of claim 4, wherein the method performs a memory migration that is effected by performing further operations comprising remapping memory address information from addresses in the first portion of system memory to corresponding addresses in the second portion of system memory in a manner that is transparent to the operating system of the computer system.

7. The method of claim 1, wherein the first and second memory controllers are integrated on a single integrated circuit.

8. The method of claim 1, wherein the first and second memory controllers are implemented on separate integrated circuits.

9. The method of claim 1, wherein each of the first and second portions of system memory comprise a respective memory rank.

10. The method or claim 1, wherein the memory data that is migrated or copied includes at least a portion of the operating system or at least a portion of a software application running on the operating system.

11. A System on a Chip (SoC), configured to be implemented in a computer system including a first memory module interface in which a first memory module including a first portion of system memory is installed and a second memory module interface in which a second memory module including a second portion of system memory is installed, the computer system including an operating system running in system memory on the SoC and system BIOS, the SoC comprising:
a plurality of processor cores;
a plurality of caches, configured as a multi-level cache;
a first memory controller, operatively coupled to the multi-level cache and communicatively coupled to a first memory interface configured to facilitate communication between the first memory controller and the first memory module interface;
a second memory controller, operatively coupled to the multi-level cache and communicatively coupled to a second memory interface configured to facilitate communication between the second memory controller and the second memory module interface; and
embedded logic configured to enable a hardware-based memory migration or copy operation when the SoC is installed in the computer system and operating, wherein during the hardware-based memory migration or copy operation memory data is migrated or copied from the first portion of system memory to the second portion of system memory in a manner that is transparent to the operating system and to the system BIOS.

12. The SoC of claim 11, wherein the first memory controller includes a sparing engine in which a portion of the embedded logic is implemented, wherein the sparing engine facilitates memory data copying operations to facilitate the hardware-based memory migration or copy operations.

13. The SoC of claim 11, further comprising embedded logic configured to,
maintain cache line status information identifying a status of each cache line in the first portion of system memory;
detect a cache line failure in a first cache line in the first portion of system memory;
mark the first cache line as poisoned in the cache line status information;
during the hardware-based memory migration or copy operation, migrate or copy the cache line status information, wherein a second cache line in the second portion of system memory containing data migrated or copied from the first cache line is marked as poisoned.

14. The SoC of claim 13, wherein the multi-level cache includes a last layer cache coherence engine via which directory information for each of the first and second portions of system memory is maintained.

15. The SoC of claim 11, wherein the first memory controller includes programmed logic configured to facilitate memory data copy operations associated with the memory migration or copy operations by performing operations comprising:
reading data from cache lines in the first portion of system memory and generating corresponding memory Write requests to the second memory controller causing a copy of data in each of the cache lines that is read in the first portion of system memory to be written to a corresponding cache line in the second portion of system memory.

16. The SoC of claim 15, wherein the embedded logic is further configured to,
perform memory Reads and memory Writes for each cache line in the first and second portions of system memory such that first and second portions of system memory are mirrored to initialize a mirrored memory configuration; and
maintain a mirrored memory configuration by employing the first memory controller as a master node and the second memory controller as a slave node, wherein in response to a memory Read request, data is read from a corresponding cache line in the first portion of system memory via the first memory controller, and in response to a memory Write request, memory is written to corresponding cache lines in the first and second portions of system memory to effect a mirrored Write of data.

17. The SoC of claim 11, wherein the memory data that is migrated or copied includes at least a portion of the operating system or at least a portion of a software application running on the operating system.

18. A computer system comprising:
a main board, comprising first and second sockets and first and second memory module interfaces in which first and second portions of system memory are installed;
a first processor installed in the first socket comprising,
a plurality of processor cores;
a first plurality of caches, configured as a multi-level cache;
a first memory controller, operatively coupled to the multi-level cache and communicatively coupled to a first memory interface configured to facilitate communication between the first memory controller and the first portion of system memory installed in the first memory module interface;
a second processor installed in the second socket comprising, a plurality of processor cores;

a second plurality of caches, configured as a multi-level cache;

a second memory controller, operatively coupled to the multi-level cache and communicatively coupled to a first memory interface configured to facilitate communication between the first memory controller and the second portion of system memory installed in the second memory module interface; and system BIOS, wherein the first and second processors further include embedded logic configured to enable a hardware-based memory migration or copy operations during operation of the computer system, wherein during the hardware-based memory migration or copy operation memory data is migrated or copied from the first portion of system memory to the second portion of system memory in a manner that is transparent to an operating system running in system memory on the computer system and the system BIOS.

19. The computer system of claim 18, wherein the first memory controller includes a sparing engine in which a portion of the embedded logic is implemented, wherein the sparing engine facilitates memory data copying operations to facilitate the hardware-based memory migration or copy operations.

20. The computer system of claim 18, wherein the first and second processors further comprise embedded logic configured to, detect a cache line failure in a first cache line in the first portion of system memory;

mark the first cache line as poisoned in cache line status information; and during the hardware-based memory migration or copy operations, migrate or copy the cache line status information, wherein a second cache line in the second portion of system memory containing data migrated or copied from the first cache line is marked as poisoned.

21. The computer system of claim 20, wherein the first and second processors include embedded logic configured to initialize a memory mirror configuration in which the first and second portions of memory are mirrored by employing a hardware-based memory data copy scheme under which memory data is copied from cache lines in the first portion of system memory to corresponding cache lines in the second portion of data.

22. The computer system of claim 21, wherein memory copy operations are facilitated by reading data from cache lines in the first portion of system memory using the first memory controller and generating corresponding memory Write requests via the first memory controller to the second memory controller causing a copy of data in each of the cache lines that is read in the first portion of system memory to be written to a corresponding cache line in the second portion of system memory.

23. The computer system of claim 18, wherein the memory data that is migrated or copied includes at least a portion of the operating system or at least a portion of a software application running on the operating system.

* * * * *